US012724309B2

(12) United States Patent
Hsu et al.

(10) Patent No.: US 12,724,309 B2
(45) Date of Patent: Sep. 1, 2026

(54) ELECTRONIC DEVICE

(71) Applicant: InnoLux Corporation, Miao-Li County (TW)

(72) Inventors: Hsu-Kuan Hsu, Miao-Li County (TW); Tzu-Chieh Lai, Miao-Li County (TW); Chih-Chin Kuo, Miao-Li County (TW); En-Hsiang Chen, Miao-Li County (TW); Wen-Qi Lin, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 192 days.

(21) Appl. No.: 18/409,164

(22) Filed: Jan. 10, 2024

(65) Prior Publication Data

US 2024/0248351 A1 Jul. 25, 2024

(30) Foreign Application Priority Data

Jan. 19, 2023 (CN) ......................... 202310063189.8

(51) Int. Cl.
*G02F 1/1343* (2006.01)
*G02F 1/1335* (2006.01)

(52) U.S. Cl.
CPC .... *G02F 1/13439* (2013.01); *G02F 1/133502* (2013.01)

(58) Field of Classification Search
CPC ......... G02F 1/134372; G02F 1/133502; G02F 1/13439; G02F 1/134363
See application file for complete search history.

(56) References Cited

U.S. PATENT DOCUMENTS

2015/0170600 A1 6/2015 Jinda et al.
2018/0275477 A1* 9/2018 Miyazaki .................. E06B 9/24
2020/0241336 A1* 7/2020 Yamamoto ........ G02F 1/134363
2023/0004052 A1* 1/2023 Komitov ............. G02F 1/16756

FOREIGN PATENT DOCUMENTS

CN 105301850 B 5/2019
JP 2002182228 A 6/2002
TW 202202922 A 1/2022

* cited by examiner

*Primary Examiner* — Nathanael R Briggs
(74) *Attorney, Agent, or Firm* — MUNCY, GEISSLER, OLDS & LOWE, P.C.

(57) ABSTRACT

An electronic device includes: a panel, including: a first substrate; a second substrate disposed opposite to the first substrate; a light modulation layer disposed between the first substrate and the second substrate; a plurality of first strip electrodes disposed between the first substrate and the light modulation layer; a plurality of second strip electrodes disposed between the second substrate and the light modulation layer; a first electrode disposed between the first substrate and the plurality of first strip electrodes; and a second electrode disposed between the second substrate and the plurality of second strip electrodes, wherein the light modulation layer includes a liquid crystal material and a dye material, and an extension direction of the plurality of first strip electrodes is different from an extension direction of the plurality of second strip electrodes.

13 Claims, 9 Drawing Sheets

600

ELECTRONIC DEVICE

CROSS-REFERENCE TO RELATED APPLICATIONS

This application claims the benefits of the Chinese Patent Application Ser. No. 20/231,0063189.8, filed on Jan. 19, 2023, the subject matter of which is incorporated herein by reference.

BACKGROUND

Field

The present disclosure relates to an electronic device. More specifically, the present disclosure relates to an electronic device with a light modulation layer.

Description of Related Art

Light modulating devices have been widely used in smart windows or other applications. Through electronic control, the light modulating devices can be in a transmissive state, a gray scale state or a dark state, etc., to achieve light transmission or shading effects.

However, the current light modulating devices still have many disadvantages, such as low light transmittance in the transmissive state, or insufficient darkness in the non-transmissive state, high cost, large thickness, or heavy weight. Therefore, it is desirable to provide a novel electronic device to solve the conventional defects.

SUMMARY

The present disclosure provides an electronic device, which comprises: a panel, comprising: a first substrate; a second substrate disposed opposite to the first substrate; a light modulation layer disposed between the first substrate and the second substrate; a plurality of first strip electrodes disposed between the first substrate and the light modulation layer; a plurality of second strip electrodes disposed between the second substrate and the light modulation layer; a first electrode disposed between the first substrate and the plurality of first strip electrodes; and a second electrode disposed between the second substrate and the plurality of second strip electrodes, wherein the light modulation layer comprises a liquid crystal material and a dye material, and an extension direction of the plurality of first strip electrodes is different from an extension direction of the plurality of second strip electrodes.

Other novel features of the disclosure will become more apparent from the following detailed description when taken in conjunction with the accompanying drawings.

DETAILED DESCRIPTION

Figure 1:
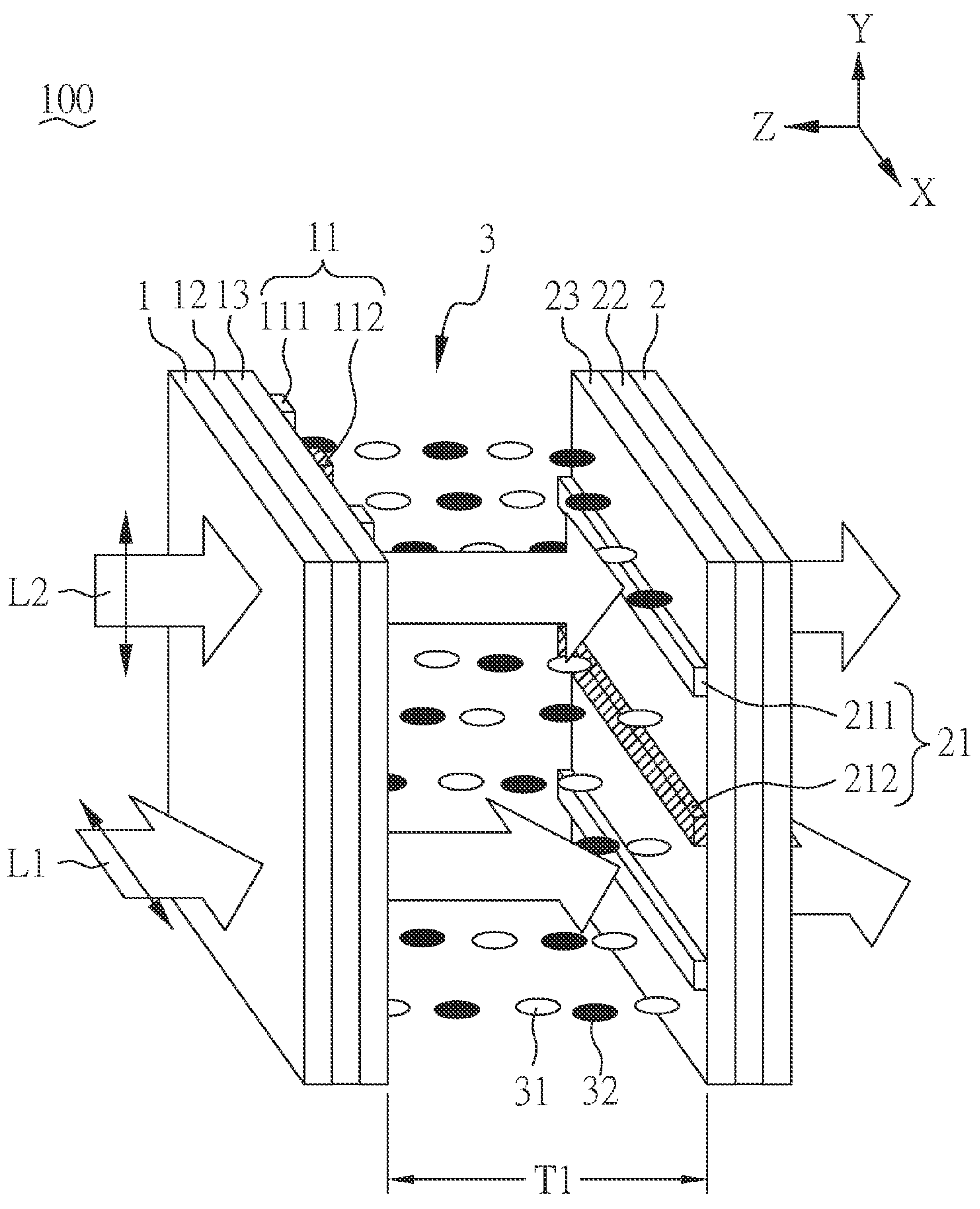
FIG. 1 is a schematic view showing a part of an electronic device according to one embodiment of the present disclosure.

The following is specific embodiments to illustrate the implementation of the present disclosure. Those who are familiar with this technique can easily understand the other advantages and effects of the present disclosure from the content disclosed in the present specification. The present disclosure can also be implemented or applied by other different specific embodiments, and various details in the present specification can also be modified and changed according to different viewpoints and applications without departing from the spirit of the present disclosure.

It should be noted that, in the present specification, when a component is described to have an element, it means that the component may have one or more of the elements, and it does not mean that the component has only one of the element, except otherwise specified.

In the specification and the appended claims of the present disclosure, certain words are used to refer to specific elements. Those skilled in the art should understand that electronic device manufacturers may refer to the same components by different names. The present specification does not intend to distinguish between elements that have the same function but have different names.

In the following description and claims, words such as "comprising", "including", "containing", and "having" are open-ended words, so they should be interpreted as meaning "containing but not limited to . . . ". Therefore, when the terms "comprising", "including", "containing" and/or "having" are used in the description of the present disclosure, they specify the existence of corresponding features, regions, steps, operations and/or components, but do not exclude the existence of one or more corresponding features, regions, steps, operations and/or components.

The terms, such as "about", "equal to", "equal" or "same", "substantially", or "approximately", are generally interpreted as within 20% of a given value or range, or within 10%, 5%, 3%, 2%, 1%, or 0.5% of a given value or range. The quantity given here is an approximate quantity, that is, without specifying "about", "approximately", "substantially" and "approximately", "about", "approximately", "substantially" and "approximately" can still be implied. Furthermore, when a value is "in a range from a first value to a second value" or "in a range between a first value and a second value", the value can be the first value, the second value, or another value between the first value and the second value.

The following disclosure provides many different embodiments or examples for implementing different elements in the provided display device. Specific examples of each component and its configuration are described below to simplify the embodiments of the present disclosure. Of course, these are just examples, not intended to limit the present disclosure. For example, if the description mentions that a first element is formed on a second element, it may include an embodiment in which the first and second elements are in direct contact, and may also include an embodiment in which an additional element formed between the first and second elements so that they are not in direct contact. In addition, the embodiments of the present disclosure may repeat element symbols and/or characters in different examples. This repetition is for brevity and clarity and is not intended to represent a relationship between the different embodiments and/or aspects discussed.

Directional terms mentioned herein, such as "up", "down", "front", "rear", "left", "right" and similar terms, are only referring to the directions of the drawings. Accordingly, the directional terms are used to illustrate and not to limit the present disclosure.

In some embodiments of the present disclosure, terms related to bonding or connecting, such as "connecting", "interconnecting" and similar terms, unless otherwise specified, may mean that two structures are in direct contact, or may also mean that two structures are not in direct contact where other structures are disposed between the two structures. The terms about bonding and connecting may also include the case where both structures are movable, or both structures are fixed. In addition, the terms "electrically connecting" and "coupling" include any direct and indirect electrical connection means.

The ordinals recited in the specification and the claims such as "first", "second" and so on are intended only to describe the elements claimed and imply or represent neither that the claimed elements have any proceeding ordinals, nor that sequence between one claimed element and another claimed element or between steps of a manufacturing method. The use of these ordinals is merely to differentiate one claimed element having a certain designation from another claimed element having the same designation. The claims and the description may not use the same term, accordingly, the first component in the description may be the second component in the claim.

In the present disclosure, the measurement of thickness may be achieved by using an optical microscope or from a cross-sectional image of an electron microscope; but the present disclosure is not limited thereto. Furthermore, any two values or directions used for comparison may have certain errors. If the first value is equal to the second value, it implies that there may be an error of about 10% between the first value and the second value. If the first direction is perpendicular to the second direction, the angle between the first direction and the second direction may be between 80° and 100°. If the first direction is parallel to the second direction, the angle between the first direction and the second direction may be between 0° and 10°. In the present specification, except otherwise specified, the terms (including technical and scientific terms) used herein have the meanings generally known by a person skilled in the art. It should be noted that, except otherwise specified, in the embodiments of the present disclosure, these terms (for example, the terms defined in the generally used dictionary) should have the meanings identical to those known in the art, the background of the present disclosure or the context of the present specification, and should not be read by an ideal or over-formal way, unless otherwise specified in the embodiments of the present disclosure.

Some variations of the embodiment are described below. In the different drawings and described embodiments, similar reference numerals are used to designate similar elements. It can be understood that additional operations may be provided before, during and after the method, and some described operations may be replaced or deleted in other embodiments of the method.

It should be understood that, according to the embodiments of the present disclosure, an optical microscope (OM), a scanning electron microscope (SEM), a film thickness profilometer ($\alpha$-step), an ellipsometer, or other suitable methods may be used to measure the depth, thickness, width or height of each component, or the spacing or distance between components. According to some embodiments, a scanning electron microscope can be used to obtain a cross-sectional structure image including the components to be measured, and measure the depth, thickness, width or height of each component, or the spacing or distance between components.

The electronic device of the present disclosure may include a display device, a backlight device, an antenna device, a sensing device or a tiled device, but the present disclosure is not limited thereto. The electronic device may be a bendable or flexible electronic device. The display device may be a non-self-luminous display device or a self-luminous display device. The antenna device may be a liquid crystal type antenna device or a non-liquid crystal type antenna device, and the sensing device may be a sensing device for sensing capacitance, light, thermal energy or ultrasonic waves, but is not limited thereto. The electronic components may include passive components and active components, such as capacitors, resistors, inductors, diodes, transistors, and the like. The diodes may comprise light emitting diodes or photodiodes. The light emitting diodes may for example, comprise organic light emitting diodes (OLEDs), mini light emitting diodes (mini LEDs), micro light emitting diodes (micro LEDs) or quantum dot light emitting diodes (quantum dot LEDs), but the present disclosure is not limited thereto. The tiled device may be, for example, a tiled display device or a tiled antenna device, but is not limited thereto. It should be noted that the electronic device may be any combination of the aforementioned device, but not limited thereto. In the following, the display device is used as an electronic device or tiled device to illustrate the content of the present disclosure, but the present disclosure is not limited thereto.

In addition, the shape of the electronic device may be rectangular, circular, polygonal, a shape with curved edges, or other suitable shapes. The electronic device may have peripheral systems such as a processing system, a drive system, a control system, a light source system, and a shelf system to support a display device or a tiled device.

It should be noted that the electronic device can be any combination of the aforementioned device, but not limited thereto. It should be noted that in the following embodiments, without departing from the spirit of the present disclosure, features in several different embodiments may be replaced, reorganized, and mixed to complete other embodiments. As long as the features of the various embodiments do not violate or conflict the spirit of the disclosure, they can be mixed and matched arbitrarily.

FIG. 1 is a schematic view showing a part of an electronic device according to one embodiment of the present disclosure.

In some embodiments of the present disclosure, the electronic device may comprise a panel 100, as shown in FIG. 1. The panel 100 may comprise: a first substrate 1; a second substrate 2 opposite to the first substrate 1; a light modulation layer 3 disposed between the first substrate 1 and the second substrate 2, wherein the light modulation layer 3 comprises a liquid crystal material 31 and a dye material 32; a plurality of first strip electrodes 11 disposed between the first substrate 1 and the light modulation layer 3; a plurality of second strip electrodes 21 disposed between the second substrate 2 and the light modulation layer 3; a first electrode 12 disposed between the first substrate 1 and the plurality of first strip electrode 11; and a second electrode 22 disposed between the second substrate 2 and the plurality of second strip electrodes 21, wherein an extension direction of the plurality of first strip electrodes 11 is different from an extension direction of the plurality of second strip electrodes 21.

More specifically, as shown in FIG. 1, the first electrode 12 and/or the second electrode 22 may be a planar electrode, and the first electrode 12 and the second electrode 22 are respectively disposed on the first substrate 1 and the second substrate 2. The plurality of first strip electrodes 11 may extend along the second direction Y, the plurality of first strip electrodes 11 may arrange along the first direction X, and there is a gap between adjacent first strip electrodes 11. The plurality of second strip electrodes 21 may extend along the first direction X, the plurality of second strip electrodes 21 may arrange along the second direction Y, and there is a gap between adjacent second strip electrodes 21. The first direction X is different from the second direction Y. For example, the first direction X may be perpendicular to the second direction Y. In the normal direction Z of the first substrate 1, the extension direction of the plurality of first strip electrodes 11 (such as the second direction Y) may be perpendicular to (i.e., orthogonal to) the extension direction of the plurality of second strip electrodes 21 (such as the first direction X). In addition, the plurality of first strip electrodes 11 may comprise a plurality of first parts 111 and a plurality of second parts 112, and the plurality of first parts 111 and the plurality of second parts 112 are alternately arranged along the first direction X. Similarly, the plurality of second strip electrodes 21 may comprise a plurality of third parts 211 and a plurality of fourth parts 212, and the plurality of third parts 211 and the plurality of fourth parts 212 are alternately arranged along the second direction Y. In FIG. 1, an example that two first parts 111 and one second part 112 are disposed on the first substrate 1 is provided, but the present disclosure is not limited thereto. Similarly, an example that two third parts 211 and one fourth part 212 are disposed on the second substrate 2 is provided, but the present disclosure is not limited thereto.

In the present disclosure, the panel is in a transmissive state when no potential is applied to the plurality of first strip electrodes 11, the plurality of second strip electrodes 21, the first electrode 12 and the second electrode 22. As shown in FIG. 1, when no potential is applied to the plurality of first strip electrodes 11, the plurality of second strip electrodes 21, the first electrode 12 and the second electrode 22, horizontally polarized light L1 and vertically polarized light L2 can be perpendicular to the long axis directions of the liquid crystal material 31 and the dye material 32 respectively. Thus, the horizontally polarized light L1 and the vertically polarized light L2 are not easily absorbed by the dye material 32, and for example, most of the horizontally polarized light L1 and the vertically polarized light L2 pass through the panel 100, so that the panel 100 is in a transmissive state. The electronic device of the present disclosure does not require an additional polarizer, so the light transmittance of the panel 100 in the transmissive state can be increased, or the overall thickness and weight of the electronic device can be reduced. However, the present disclosure is not limited thereto.

In the present disclosure, the first substrate 1 and second substrate 2 may be prepared using the same or different materials, and the materials of the first substrate 1 and second substrate 2 may include glass, quartz, sapphire, ceramics, polycarbonate (PC), polyimide (PI), polyethylene terephthalate (PET), polymethylmethacrylate (PMMA), other suitable substrate materials or a combinations thereof, but the present disclosure is not limited thereto. In the present disclosure, the first strip electrodes 11, the first electrode 12, the second strip electrodes 21, and the second electrode 22 may be prepared using the same or different materials, and the materials of the first strip electrodes 11, the first electrode 12, the second strip electrodes 21, and the second electrode 22 may include transparent conductive material, metal material, metal oxide material, an alloy or a combination thereof, such as gold, silver, copper, aluminum, chromium, platinum, indium zinc oxide (IZO), indium tin oxide (ITO), indium tin zinc oxide (ITZO), indium gallium zinc oxide (IGZO), or aluminum zinc oxide (AZO), but the present disclosure is not limited thereto.

In the present disclosure, in the normal direction Z of the first substrate 1, a thickness T1 of the light modulation layer 3 may range from 5 μm to 25 μm (5 μm≤Thickness T1≤25 μm), and for example, from 8 μm to 20 μm (8 μm≤Thickness T1≤20 μm), but the present disclosure is not limited thereto. When the thickness T1 of the light modulation layer 3 is within the above range, the light transmission control effect of the panel 100 can be improved. The liquid crystal material 31 may include a positive type liquid crystal, for example, may include a guest host type liquid crystal (GHLC) or a dye liquid crystal, but the present disclosure is not limited thereto. The dye material 32 may include a dichroic dye, and has the absorptivity for light having a wavelength ranging from, for example, 360 nm to 830 nm. The color of the dye material 32 may be, for example, black, purple, orange, blue, other suitable colors or a combination thereof, but the present disclosure is not limited thereto. The dye material 32 with different colors can absorb light with different wavelengths and can be used to change the color of transmitted light.

In the present disclosure, the panel 100 may further comprise a first insulating layer 13 and a second insulating layer 23, the first insulating layer 13 is disposed between the first electrode 12 and the first strip electrodes 11, and the second insulating layer 23 is disposed between the second electrode 22 and the second strip electrodes 21, but the present disclosure is not limited thereto. In the present disclosure, the first insulating layer 13 and the second insulating layer 23 may be prepared using the same or different materials, and the materials of the first insulating layer 13 and the second insulating layer 23 may include silicon oxide, silicon nitride, silicon oxynitride, other suitable materials or a combination thereof, but the present disclosure is not limited thereto.

Figure 2:
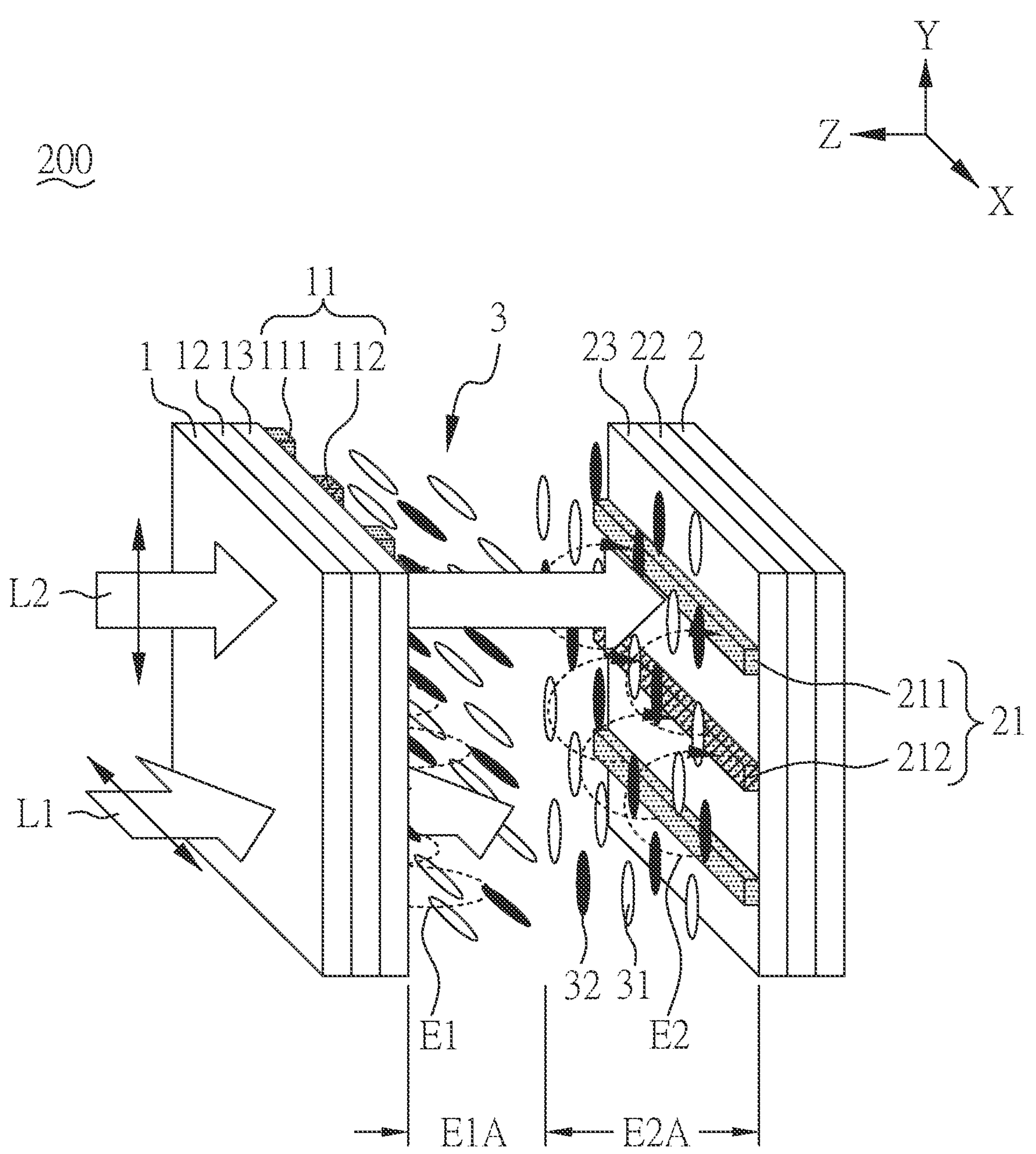
FIG. 2 is a schematic view of an electronic device driven in a non-transmissive state according to one embodiment of the present disclosure.

FIG. 2 is a schematic view of an electronic device driven in a non-transmissive state according to one embodiment of the present disclosure. For the convenience of illustration, the dotted lines in the figure represent the direction of the electric field, and the filling patterns represent the electrodes to which the potential is applied.

In one embodiment of the present disclosure, when the panel 200 is in a non-transmissive state, as shown in FIG. 2, a first potential V1 is applied to the plurality of first parts 111 of the plurality of the first strip electrodes 11, a second potential V2 is applied to the plurality of second parts 112 of the plurality of the first strip electrodes 11, a third potential V3 is applied to the plurality of third parts 211 of the plurality of second strip electrodes 21, and a fourth potential V4 is applied to the plurality of fourth parts 212 of the plurality of second strip electrodes 21. The first potential V1 is different from the second potential V2, and the third potential V3 is different from the fourth potential V4, but the present disclosure is not limited thereto. In one embodiment, the potential difference between the first potential V1 and the second potential V2 is the same as the potential difference between the third potential V3 and the fourth potential V4, but the present disclosure is not limited thereto. For example, a horizontal electric field along the first direction X (called the first horizontal electric field E1) can be generated between the first potential V1 and the second potential V2, and a horizontal electric filed along the second direction Y (called the second horizontal electric field E2) can be generated between the third potential V3 and the fourth potential V4. Due to the influence of the above two horizontal electric fields, the long axis directions of the liquid crystal material 31 and the dye material 32 located at the first horizontal electric field E1A can, for example, be modulated and arranged to be approximately parallel to the horizontally polarized light L1, and the long axis directions of the liquid crystal material 31 and the dye material 32 located at the second horizontal electric field E2A can, for example, be modulated and arranged approximately parallel to the vertically polarized light L2. Through the above driving, most of the horizontally polarized light L1 and most of the vertically polarized light L2 are, for example, easily absorbed by the dye material 32, so that the panel 200 is in a non-transmissive state, such as a dark state.

More specifically, as shown in FIG. 2, due to the influence of the electric field generated by the first potential V1 and the second potential V2 (such as the first horizontal electric field E1), the long axis directions of the liquid crystal material 31 and the dye material 32 close to the first substrate 1 can be approximately parallel to the first direction X, so most of the horizontally polarized light L1 can be absorbed by the dye material 32. Similarly, due to the influence of the electric field generated by the third potential V3 and the fourth potential V4 (such as the second horizontal electric field E2), the long axis directions of the liquid crystal material 31 and the dye material 32 close to the second substrate 2 can be approximately parallel to the second direction Y, so most of the vertically polarized light L2 can be absorbed by the dye material 32. Thus, the panel 200 is in a non-transmissive state. In some embodiments, the potential difference between the first potential V1 and the second potential V2 may be the same as the potential difference between the third potential V3 and the fourth potential V4 (i.e., $\Delta V12=\Delta V34$), so the panel 200 is in a dark state; but the present disclosure is not limited thereto. Since the dark state effect of the panel 200 in the non-transmissive state can be improved without disposing additional polarizers or multiple laminated panels in the electronic device of the present disclosure, the overall thickness, weight or cost of the electronic device can be reduced.

Figure 3:
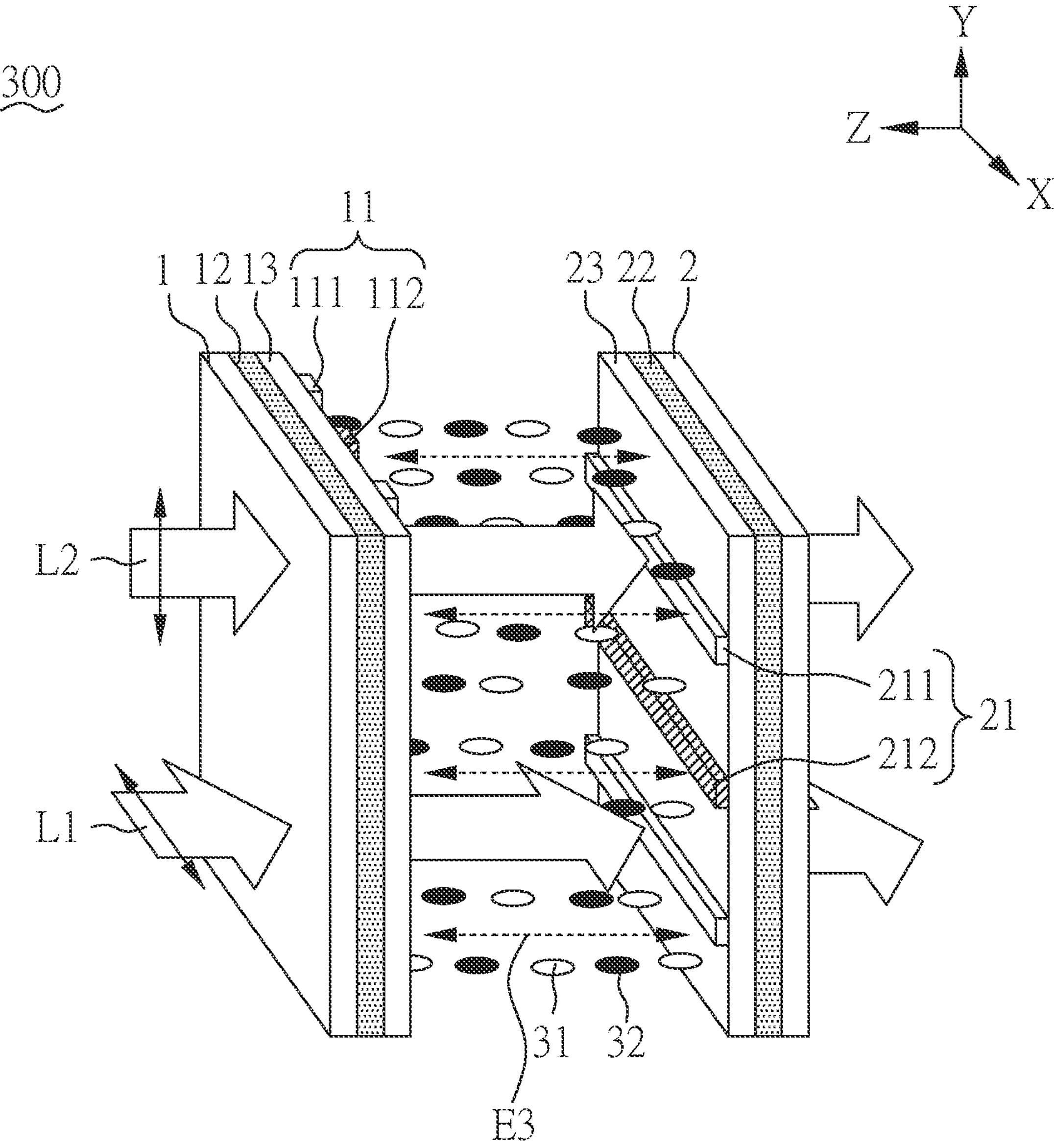
FIG. 3 is a schematic view of an electronic device driven in a transmissive state according to one embodiment of the present disclosure.

FIG. 3 is a schematic view of an electronic device driven in a transmissive state according to one embodiment of the present disclosure. For the convenience of illustration, the dotted lines in the figure represent the direction of the electric field, and the filling patterns represent the electrodes to which the potential is applied.

When the panel 300 is in a transmissive state, as shown in FIG. 3, the potential applied to the first electrode 12 may be different from the potential applied to the second electrode 22. For example, a fifth potential V5 may be applied to the first electrode 12, and a sixth potential V6 may be applied to the second electrode 22, and the fifth potential V5 is different from the sixth potential V6. Due to the influence of the electric field generated between the fifth potential V5 and the sixth potential V6 (i.e. the vertical electric field E3), the long axis directions of the liquid crystal material 31 and the dye material 32 can be approximately perpendicular to the horizontally polarized light L1 and the vertically polarized light L2. That is, the long axis directions of the liquid crystal material 31 and the dye material 32 can be approximately parallel to the normal direction Z of first substrate 1, so the horizontally polarized light L1 and the vertically polarized light L2, for example, are not easily absorbed by the dye material 32, and the panel 300 is in a transmissive state. Thus, the panel 300 can quickly switch from a non-transmissive state (such as a dark state or a gray-scale state) to a transmissive state, shortening the response time.

Figure 4A:
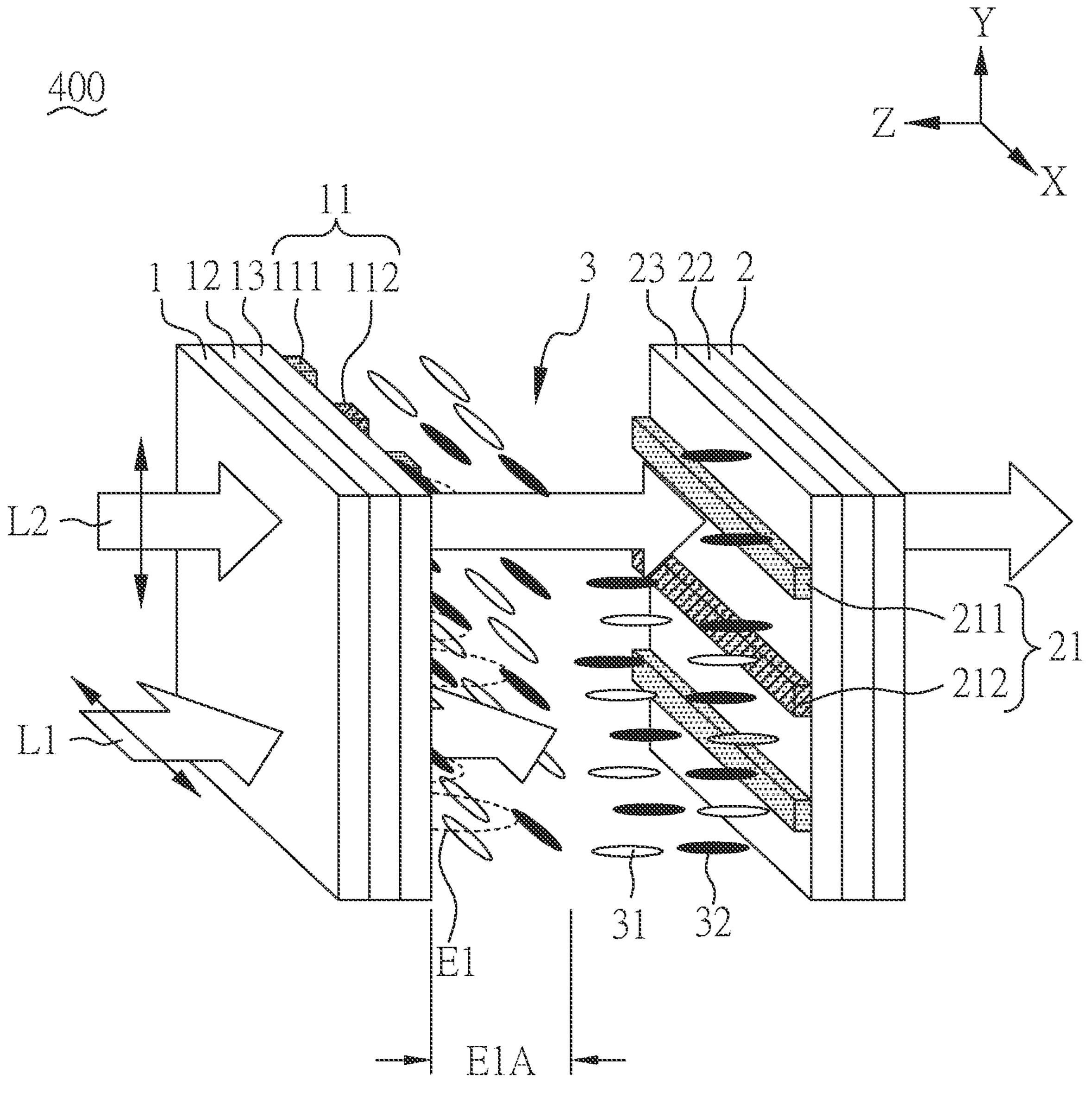
FIG. 4A and FIG. 4B are schematic views of an electronic device driven in a non-transmissive state according to one embodiment of the present disclosure.
Figure 4B:
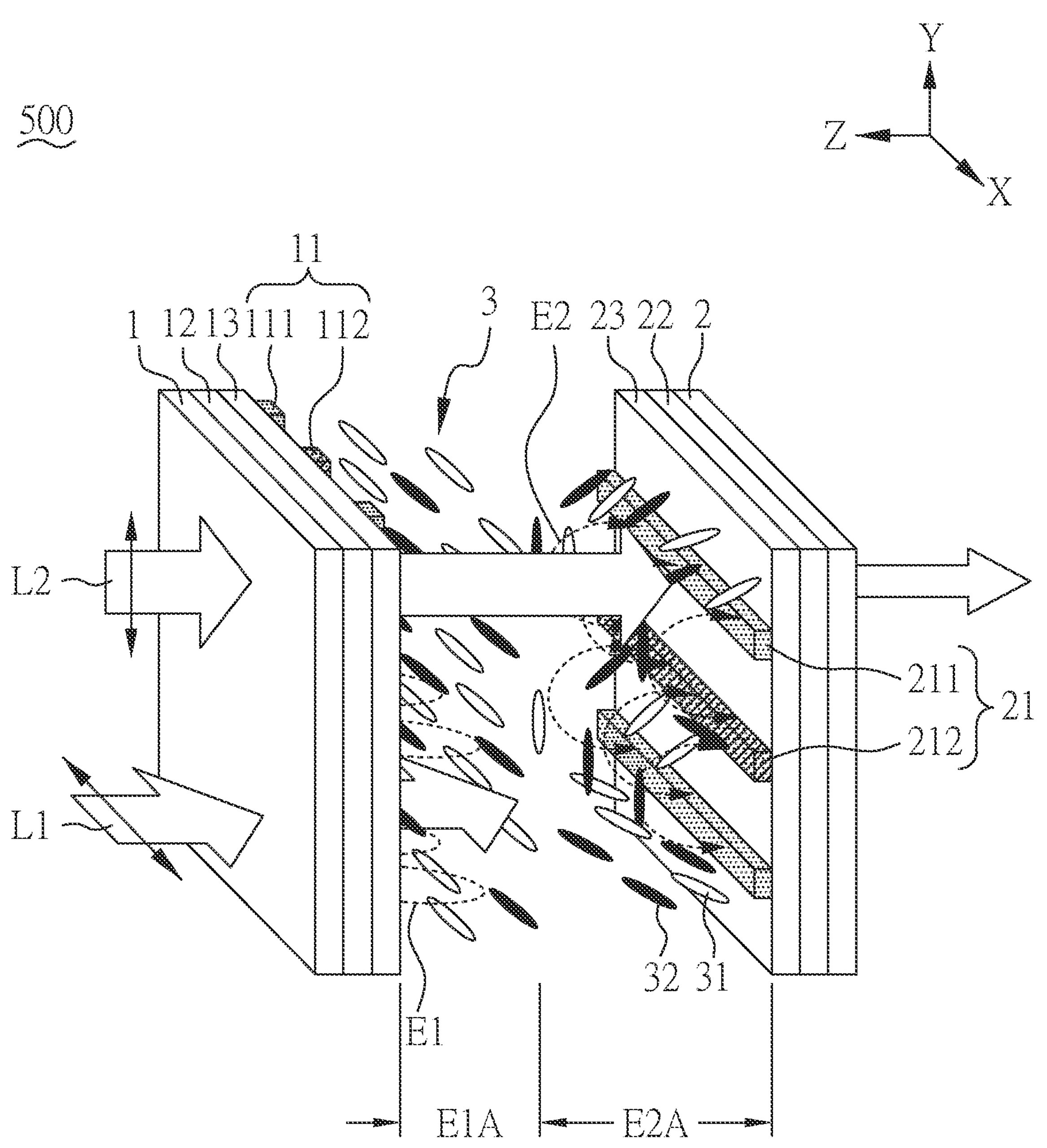

FIG. 4A and FIG. 4B are schematic views of an electronic device driven in a non-transmissive state according to one embodiment of the present disclosure. For the convenience of illustration, the dotted lines in the figure represent the direction of the electric field, and the filling patterns represent the electrodes to which the potential is applied.

In one embodiment of the present disclosure, when the panel 400 is in the non-transmissive state, as shown in FIG. 4A, a first potential V1 may be applied to the plurality of first parts 111 of the plurality of first strip electrodes 11, a second potential V2 may be applied to the plurality of second parts 112 of the plurality of first strip electrodes 11, a third potential V3 may be applied to the plurality of third parts 211 of the plurality of second strip electrodes 21, and a fourth potential V4 may be applied to the plurality of fourth parts 212 of the plurality of second strip electrodes 21, wherein the first potential V1 is different from the second potential V2, and the third potential V3 is the same as the fourth potential V4. In other words, the potential difference between the first potential V1 and the second potential V2 is greater than 0, and the potential difference between the third potential V3 and the fourth potential V4 is equal to 0. In other embodiments (not shown in the figure), when the panel 400 is in the non-transmissive state, a first potential V1 may be applied to the plurality of first parts 111 of the plurality of first strip electrodes 11, a second potential V2 may be applied to the plurality of second parts 112 of the plurality of first strip electrodes 11, no potential is not applied to the plurality of third parts 211 of the plurality of second strip electrodes 21 and the plurality of fourth parts 212 of the plurality of second strip electrodes 21, and the first potential V1 is different from the second potential V2. Through the above driving method, for example, a horizontal electric field along the first direction X can be generated between the first potential V1 and the second potential V2 (called the first horizontal electric field E1). Due to the influence of the first horizontal electric field E1, the long axis directions of part of the liquid crystal material 31 (such as the liquid crystal material 31 located at the first horizontal electric field E1A) and part of the dye material 32 (such as the dye material 32 located at the first horizontal electric field E1A) can be approximately parallel to the horizontally polarized light L1, and therefore, the horizontally polarized light L1 is easily absorbed by the dye material 21. In addition, part of the liquid crystal material 31 (such as the liquid crystal material 31 not located at the first horizontal electric field E1A) and part of the dye material 32 (such as the dye material 32 not located at the first horizontal electric field E1A), for example, are not affected by the electric field (the first horizontal electric field E1), their long axis directions can be approximately perpendicular to the vertically polarized light L2 (or parallel polarized light L1); thus, the vertically polarized light L2 is not easily absorbed by the dye material 32, and part of the light (for example, the vertically polarized light L2) can pass through the panel 400, so the panel 400 is in, for example, a gray scale state. More specifically, as shown in FIG. 4A, due to the influence of the first horizontal electric field E1 generated by the first potential V1 and the second potential V2, the long axis directions of the liquid crystal material 31 and the dye material 32 close to the first substrate 1 can be approximately parallel to the first direction X, so part of the horizontally polarized light L1 can be absorbed by dye material 32; and the liquid crystal material 31 and the dye material 32 close to the second substrate 2, for example, are not affected by the first horizontal electric field E1, and their long axis directions can be approximately parallel to the normal direction Z of the first substrate 1, so the vertically polarized light L2 is not easily absorbed by the dye material 32, and the panel 400 is in a grey scale state.

In one embodiment, when the panel 500 is in the non-transmissive state, as shown in FIG. 4B, a first potential V1 may be applied to the plurality of first parts 111 of the plurality of first strip electrodes 11, a second potential V2 may be applied to the plurality of second parts 112 of the plurality of first strip electrodes 11, a third potential V3 may be applied to the plurality of third parts 211 of the plurality of second strip electrodes 21, and a fourth potential V4 may be applied to the plurality of fourth parts 212 of the plurality of second strip electrodes 21. Herein, the first potential V1 is different from the second potential V2, and the third potential V3 is different from the fourth potential V4. In some embodiment, the potential difference between the first potential V1 and the second potential V2 may be different from the potential difference between the third potential V3 and the fourth potential V4 (i.e., $\Delta V12 \neq \Delta V34$), so the panel 500 is in a gray scale state, but the present disclosure is not limited thereto. More specifically, a horizontal electric field (the first horizontal electric field E1) is generated between the first potential V1 and the second potential V2, another horizontal field (the second horizontal electric field E2) is generated between the third potential V3 and the fourth potential V4, and the potential difference of the first horizontal electric field E1 ($\Delta V12$) is different from the potential difference of the second horizontal electric field E2 ($\Delta V34$). For example, the potential difference ($\Delta V12$) of the first horizontal electric field E1 is greater than the potential difference ($\Delta V34$) of the second horizontal electric field E2, but the present disclosure is not limited thereto. Because of the influence of the first horizontal electric field E1, the long axis directions of part of the liquid crystal material 31 (such as the liquid crystal material 31 at the first horizontal electric field E1A) and part of the dye material 32 (such as the dye material 32 at the first horizontal electric field E1A) can be approximately parallel to the horizontally polarized light L1, so most of the horizontally polarized light L1 can be absorbed by dye material 32. In addition, because of the influence of the second horizontal electric field E2, the long axis directions of only part of the liquid crystal material 31 (such as the part of the liquid crystal material 31 located at the second horizontal electric field E2A) and part of the dye material 32 (such as the part of the dye material 32 located at the second horizontal electric field E2A) can be parallel to the vertically polarized light L2, so only part of the vertically polarized light L2 is absorbed by the dye material 32, and the panel 500 is in a non-transmissive state, such as a grayscale state.

In addition, as shown in FIG. 4A and FIG. 4B, in the electronic device of FIG. 4A, most of the vertically polarized light L2 is not easily absorbed by the dye material 32, and in the electronic device of FIG. 4B, only part of the vertically polarized light L2 is absorbed by the dye material 32. Therefore, the transmittance of the panel 500 in FIG. 4B is, for example, less than that of the panel 400 in FIG. 4A. In addition, in the electronic device shown in FIG. 4A and FIG. 4B, for example, most of the horizontally polarized light L1 can be absorbed by the dye material 32 modulated by the influence of the first horizontal electric field E1, so the electronic device shown in FIG. 4A and FIG. 4B has the anti-glare property.

Figure 5:
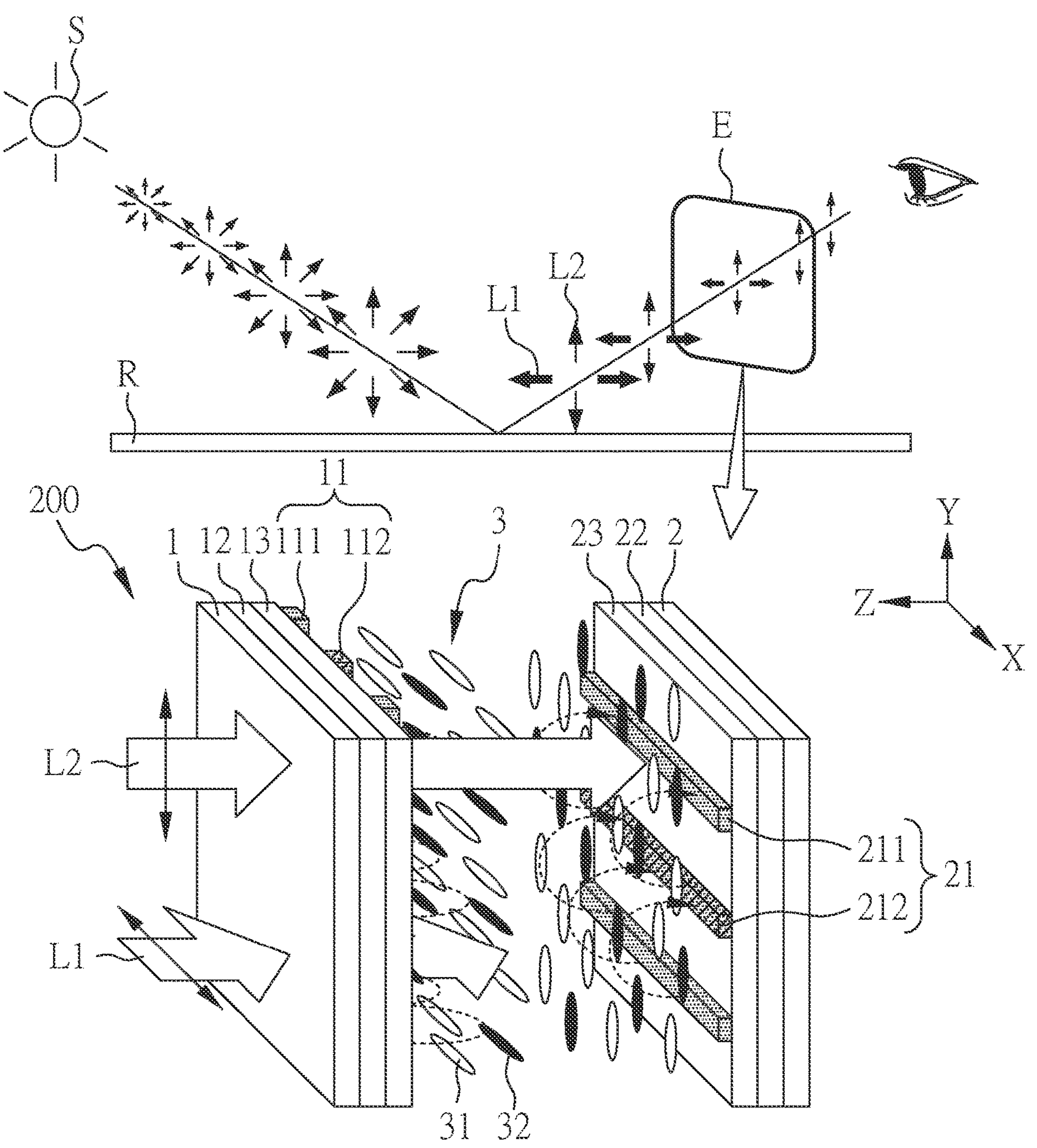
FIG. 5 is a schematic view showing the anti-glare effect of an electronic device according to one embodiment of the present disclosure.

FIG. 5 is a schematic view showing the anti-glare effect of an electronic device according to one embodiment of the present disclosure.

As shown in FIG. 5, a general light source S (such as ambient light) contains light waves vibrating in all directions. When the light source S is reflected by the reflective surface R, the horizontally polarized light (that is, the horizontally polarized light L1) will be enhanced. At this time, when viewed by the user's eyes, it is easy to cause discomfort due to the generated glare phenomenon. When the electronic device of the present disclosure is applied to anti-glare, the electronic device E can be placed between the user and the reflected light. Since the electronic device E can effectively absorb the horizontally polarized light L1, the glare phenomenon can be reduced.

In FIG. 5, the electronic device E comprising the panel 200 in FIG. 2 is taken as an example, and its detailed structure is not repeated here. In other embodiments, for example, the electronic device comprising the panel 400 shown in FIG. 4A or the panel 500 shown in FIG. 4B can be applied to anti-glare, but the present disclosure is not limited thereto.

Figure 6:
FIG. 6 is a cross-sectional view showing a part of an electronic device according to one embodiment of the present disclosure.
Figure 6:
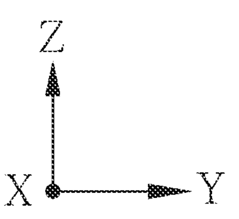
Figure 6:
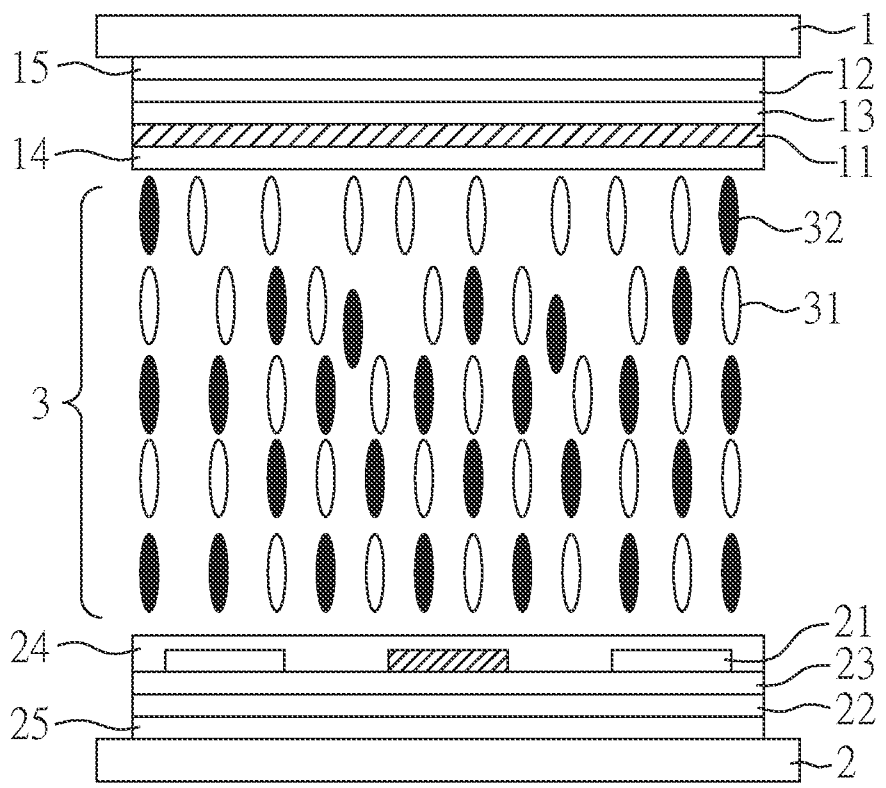

FIG. 6 is a cross-sectional view showing a part of an electronic device according to one embodiment of the present disclosure. The electronic device shown in FIG. 6 is similar to that shown in FIG. 1 except for the following differences.

In one embodiment of the present disclosure, as shown in FIG. 6, the panel 600 may further comprise: a first alignment layer 14 disposed between the light modulation layer 3 and the plurality of first strip electrodes 11; and a second alignment layer 24 disposed between the light modulation layer 3 and the plurality of second strip electrodes 21. The first alignment layer 14 and/or the second alignment layer 24 may be, for example, a vertical alignment layer, and the long axis directions of the liquid crystal material 31 and the dye material 32 can be substantially parallel to the normal direction Z of the first substrate 1 through the first alignment layer 14 and/or the second alignment layer 2, but the present disclosure is not limited to this.

In one embodiment, as shown in FIG. 6, the panel 600 may further comprise: a first refractive index matching layer 15 disposed between the first substrate 1 and the first electrode 12; and a second refractive index matching layer 25 disposed between the second substrate 2 and second electrode 22, but the present disclosure is not limited thereto. The first refractive index matching layer 15 and the second refractive index matching layer 25 can make the absolute value of the difference between the refractive indices of two adjacent media less than or equal to 0.2, which can reduce interface reflection between internal media layers, but the present disclosure is not limited thereto. More specifically, as shown in FIG. 6, the first substrate 1 may have a first refractive index n1, the first refractive index matching layer 15 may have a second refractive index n2, the first electrode 12 may have a third refractive index n3, the absolute value of the difference between the first refractive index n1 and the second refractive index n2 may be less than or equal to 0.2 (i.e., $|n2-n1|\leq 0.2$), and the absolute value of the difference between the second refractive index n2 and the third refractive index n3 may be less than or equal to 0.2 (i.e., $|n2-n3|\leq 0.2$), but the present disclosure is nit limited thereto. Similarly, the second substrate 2 may have a fourth refractive index n4, the second refractive index matching layer 25 may have a fifth refractive index n5, and the second electrode 22 may have a sixth refractive index n6, the absolute value of the difference between the fifth refractive index n5 and the fourth refractive index n4 may be less than or equal to 0.2 (i.e., $|n5-n4|\leq 0.2$), and the absolute value of the difference between the fifth refractive index n5 and the sixth refractive index n6 may be less than or equal to 0.2 (i.e., $|n5-n6|\leq 0.2$), but the present disclosure is not limited thereto.

Even not shown in the figure, the disposition position of the first refractive index matching layer 15 is not limited to that shown in FIG. 6. For example, the first refractive index matching layer 15 may be disposed on the first substrate 1, and the first substrate 1 is located between the first electrode 12 and the first refractive index matching layer 15; or the first refractive index matching layer 15 may be disposed between the first electrode 12 and the first insulating layer 13; or the first refractive index matching layer 15 may be disposed between the first insulating layer 13 and the plurality of first strip electrodes 11; but the present disclosure is not limited thereto. Similarly, the disposition position of the second refractive index matching layer 25 is not limited to that shown in FIG. 6, and the possible disposition position thereof is not repeated here.

In the present disclosure, the same or different materials may be used to prepare the first refractive index matching layer 15 and the second refractive index matching layer 25, the first refractive index matching layer 15 and the second refractive index matching layer 25 may comprise a transparent material, suitable materials may comprise silicon oxide, silicon nitride, silicon oxynitride, or a combination thereof, but the present disclosure is not limited thereto. The first refractive index matching layer 15 and the second refractive index matching layer 25 may respectively be formed by a single thin film or multiple thin films as a whole. In one embodiment, multiple refractive index matching layers may be disposed on the first substrate 1 and the second substrate 2 respectively. For example, a first refractive index matching layer 15 and a third refractive index matching layer (not shown in the figure) may be disposed on the first substrate 1, and a second refractive index matching layer 25 and a fourth refractive index matching layer (not shown in the figure) may be disposed on the second substrate 2, but the present disclosure is not limited thereto.

Figure 7:
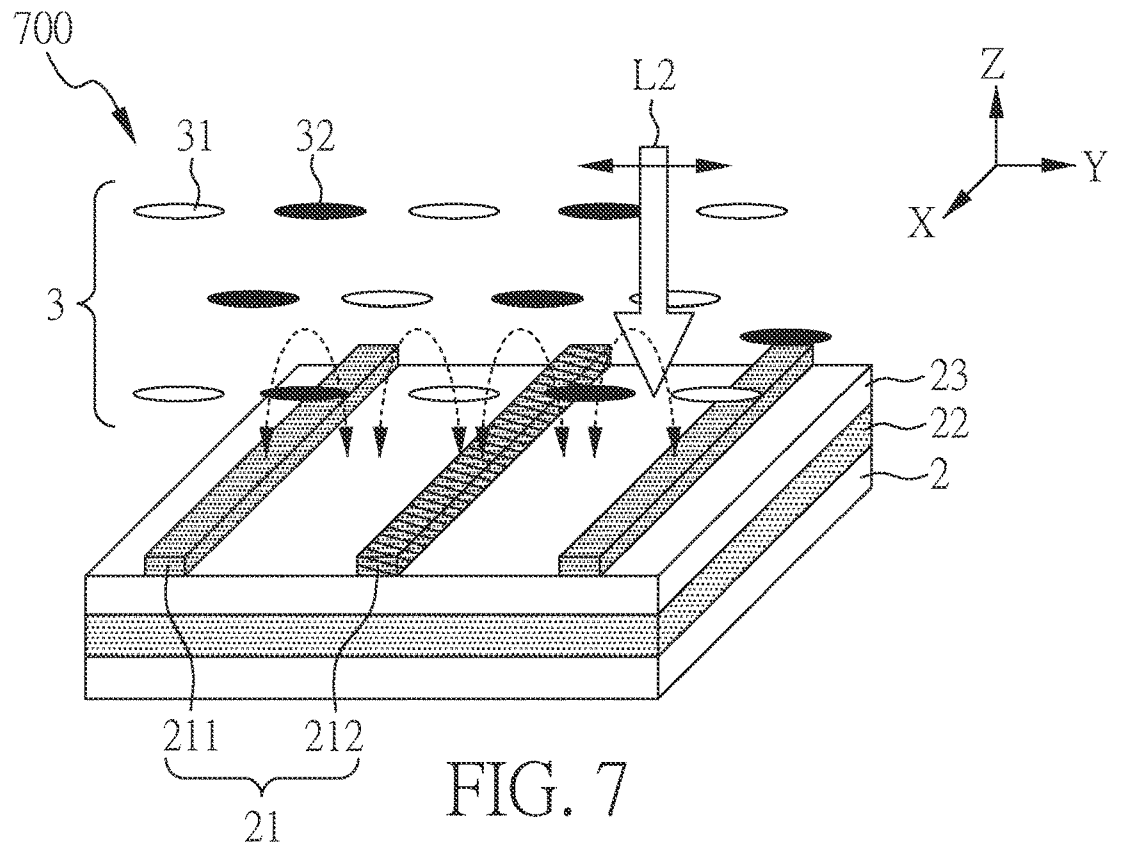
FIG. 7 is a schematic view of a part of an electronic device driven in a non-transmissive state according to one embodiment of the present disclosure.

FIG. 7 is a schematic view of a part of an electronic device driven in a non-transmissive state according to one embodiment of the present disclosure, wherein the electronic device in FIG. 7 is similar to that in FIG. 2, except for the following differences. For the convenience of illustration, FIG. 7 only shows the structure and part of the light modulation layer on the second substrate, the dotted lines in FIG. 7 represent the direction of the electric field, and the filling patterns represent the electrodes to which the potential is applied.

In one embodiment, when the panel 700 is in a non-transmissive state, as shown in FIG. 7, the third potential V3 may be applied to the plurality of third parts 211 of the plurality of second strip electrodes 21, the fourth potential V4 may be applied to the plurality of fourth parts 212 of the plurality of second strip electrodes 21, and a sixth potential V6 may be applied to the second electrode 22. Herein, the third potential V3 is the same as the fourth potential V4, and the sixth potential V6 is different from the third potential V3 or the fourth potential V4 (i.e., $V3=V4\neq V6$). Thus, due to the influence of the electric field generated by the sixth potential V6 and the third potential V3 or the fourth potential V4, the long axis directions of the liquid crystal material 31 and the dye material 32 close to the second substrate 2 may be approximately parallel to the second direction Y, so the vertically polarized light L2 may be absorbed by the dyed material 32. Similarly (not shown in the figure), the first potential V1 may be applied to the plurality of first parts 111 of the plurality of first strip electrodes 11, the second potential V2 may be applied to the plurality of second parts 112 of the plurality of first strip electrodes 11, and the fifth potential V5 may be applied to the first electrode 12, wherein the first potential V1 is the same as the second potential V2, the fifth potential V5 is different from the first potential V1 or the second potential V2 (i.e., $V1=V2\neq V5$). Thus, even not shown in the figure, due to the influence of the electric field generated by the fifth potential V5 and the first potential V1 or the second potential V2, the long axis directions of the liquid crystal material 31 and the dye material 32 close to the first substrate 1 can be approximately parallel to the first direction X, so that the horizontally polarized light L1 can be absorbed by the dye material 32. Therefore, the panel 700 can be in a non-transmissive state, such as a dark state. It should be noted that the potential difference between the sixth potential V6 and the third potential V3 (or the fourth potential V4) may be modulated, and the fifth potential V5 can be different from the first potential V1 (or the second potential V2) by adjusting potential difference therebetween, to regulate different gray scales.

Figure 8:
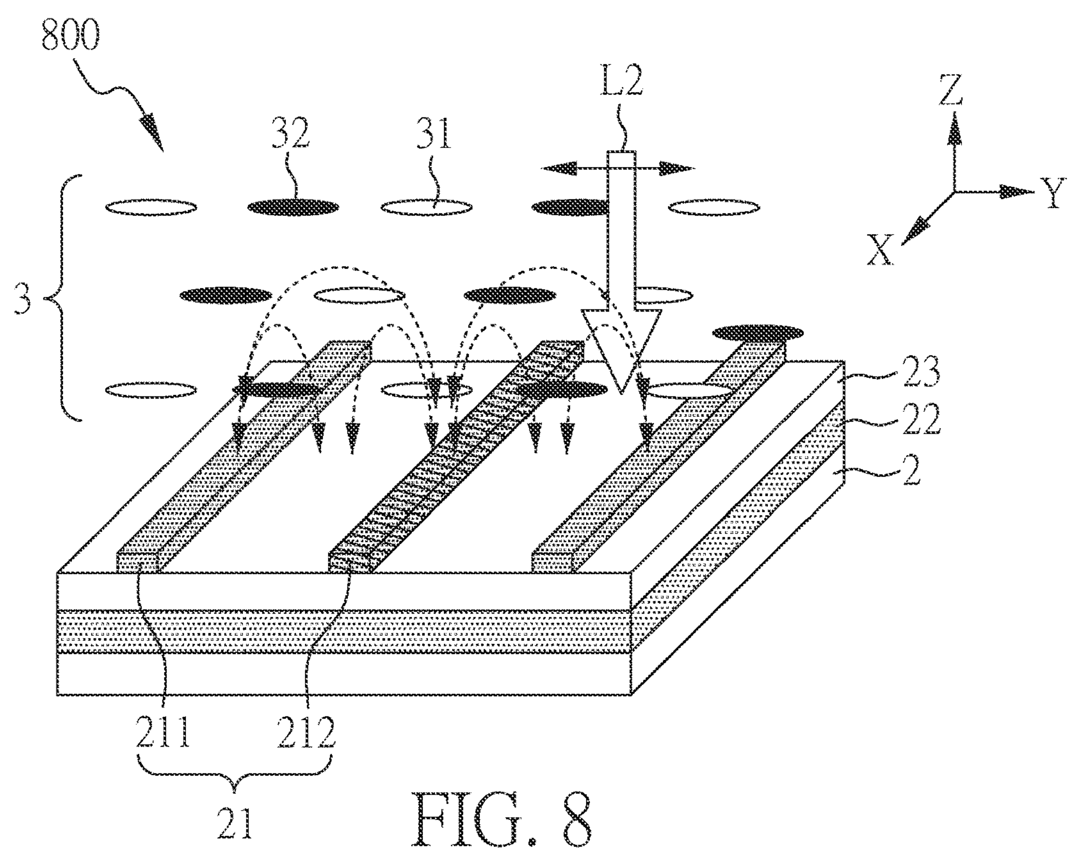
FIG. 8 is a schematic view of a part of an electronic device driven in a non-transmissive state according to one embodiment of the present disclosure.

FIG. 8 is a schematic view of a part of an electronic device driven in a non-transmissive state according to one embodiment of the present disclosure, wherein the electronic device in FIG. 8 is similar to that in FIG. 7, except for the following differences. For the convenience of illustration, the dotted lines in the figure represent the direction of the electric field, and the filling patterns represent the electrodes to which the potential is applied.

In one embodiment, when the panel 800 is in a non-transmissive state, as shown in FIG. 8, the third potential V3 may be applied to the plurality of third parts 211 of the plurality of second strip electrodes 21, the fourth potential V4 may be applied to the plurality of fourth parts 212 of the plurality of second strip electrodes 21, and the sixth potential V6 may be applied to the second electrode 22. Herein, the third potential V3 is different from the fourth potential V4, and the sixth potential V6 is different from the third potential V3 or the fourth potential V4 (i.e., $V3\neq V4\neq V6$). Therefore, due to the influence of the electric field generated by the third potential V3 and the fourth potential V4 and the electric field generated by the sixth potential V6 and the third potential V3 (or the fourth potential V4), the long axis directions of the liquid crystal material 31 and the dye material 32 close to the second substrate 2 can be approximately parallel to the second direction Y, so most of the vertically polarized light L2 can be absorbed by the dye material 32. Similarly (not shown in the figure), the first potential V1 may be applied to the plurality of first parts 111 of the plurality of first strip electrodes 11, the second potential V2 may be applied the plurality of second parts 112 of the plurality of first strip electrodes 11, and the fifth potential V5 may be applied to the first electrode 12, wherein the first potential V1, the second potential V2 and the fifth potential V5 are different from each other (i.e. V1≠V2≠V5). Thus, even not shown in the figure, due to the influence of the electric field generated by the first potential V1 and the second potential V2 and the electric field generated by the fifth potential V5 and the first potential V1 (or the second potential V2), the long axis directions of the liquid crystal material 31 and the dye material 32 close to the first substrate 1 can be approximately parallel to the first direction X, so most of the horizontally polarized light L1 can be absorbed by the dye material 32. Therefore, the panel 800 can be in a non-transmissive state, such as a dark state. It should be noted that different gray scales can be adjusted by adjusting the potential difference between the third potential V3 and the fourth potential V4 and/or the potential difference between the sixth potential V6 and the third potential V3 (or the fourth potential V4). It should be noted that different gray scales can be adjusted by adjusting the potential difference between the first potential V1 and the second potential V2 and/or the potential difference between the fifth potential V5 and the first potential V1 (or the second potential V2).

In addition, as shown in FIG. 8, since the third potential V3, the fourth potential V4 and the sixth potential V6 are different from each other, a denser electric field can be generated between the plurality of third parts 211 of the plurality of second strip electrodes 21, the plurality of fourth parts 212 of the plurality of second strip electrodes 21 and the second electrode 22, which can improve the control effect of the liquid crystal material 31 and the dye material 32, and improve the light transmission control effect of the panel 800. Similarly, since the first potential V1, the second potential V2 and the fifth potential V5 are different from each other, a denser electric field can be generated between the plurality of first parts 111 of the plurality of first strip electrodes 11, the plurality of second parts 112 of the plurality of first strip electrodes 11 and the first electrode 12, which can improve the control effect of the liquid crystal material 31 and the dye material 32, and improve the light transmission control effect of the panel 800.

Figure 9:
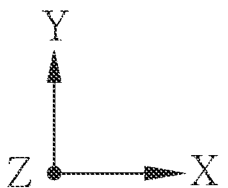
FIG. 9 is a schematic diagram of strip electrodes according to one embodiment of the present disclosure.
Figure 9:
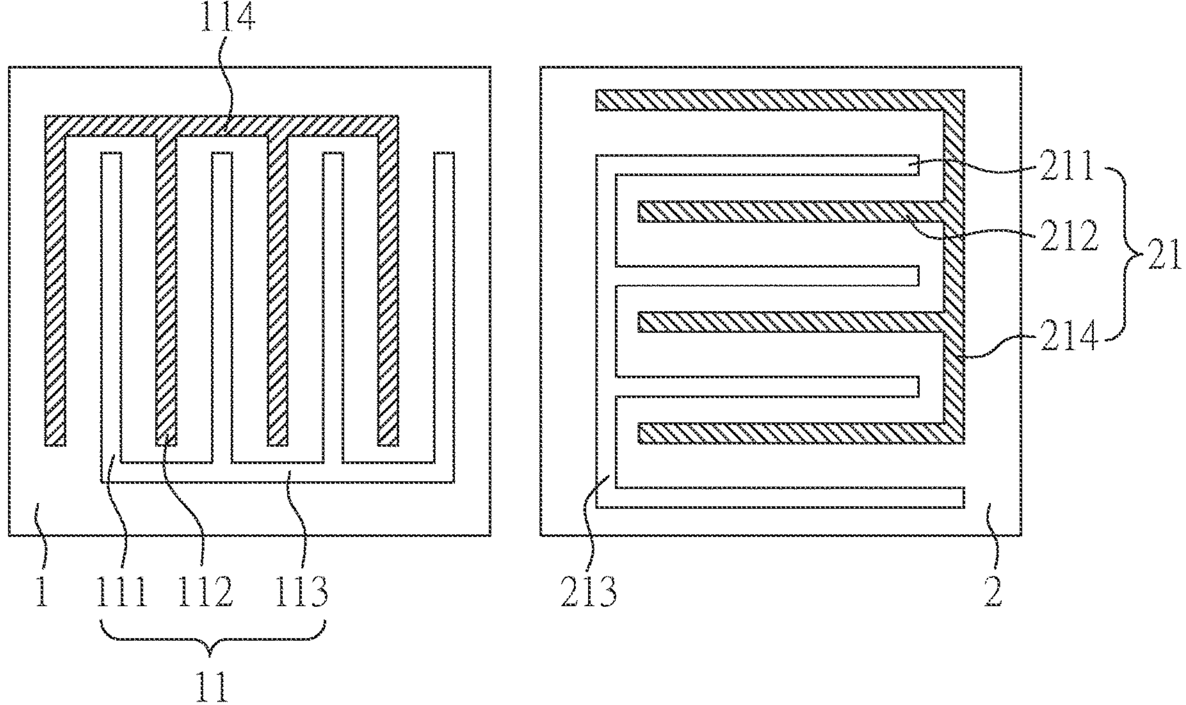

FIG. 9 is a schematic diagram of strip electrodes according to one embodiment of the present disclosure.

In one embodiment of the present disclosure, the plurality of first strip electrodes 11 and/or the plurality of second strip electrodes 21 may respectively have the comb shape. More specifically, as shown in FIG. 9, the plurality of first strip electrodes 11 are disposed on the first substrate 1, and may comprise a plurality of first parts 111, a plurality of second parts 112, a first connecting part 113 and a second connecting part 114. Herein, the plurality of first parts 111 and the plurality of second parts 112 may respectively extend along the second direction Y and may be alternately arranged along the first direction X, the plurality of first parts 111 may respectively connect to the first connecting part 113, and the plurality of second parts 112 may respectively connect to the second connecting part 114. There is a gap between two adjacent first part 111 and second part 112, so the plurality of first parts 111 and the plurality of second parts 112 are electrically insulated from each other. The plurality of first parts 111 and the plurality of second parts 112 may be respectively connected to different voltage sources which apply the first potential and the second potential to the plurality of first parts 111 and the plurality of second parts 112 respectively. Similarly, the plurality of second strip electrodes 21 are disposed on the second substrate 2, and may comprise a plurality of third parts 211, a plurality of fourth parts 212, a third connecting part 213 and a fourth connecting part 214. Herein, the plurality of third parts 211 and the plurality of fourth parts 212 may respectively extend along the first direction X and may be alternately arranged along the second direction Y, the plurality of third parts 211 may respectively connect to the third connecting part 213, and the plurality of fourth parts 212 may respectively connect to the fourth connecting part 214. In addition, there is a gap between two adjacent third part 211 and fourth part 212, so the plurality of third parts 211 and the plurality of fourth parts 212 are electrically insulated from each other. The plurality of third parts 211 and the plurality of fourth parts 212 may be respectively connected to different voltage sources which apply the third potential and the fourth potential to the plurality of third parts 211 and the plurality of fourth parts 212 respectively.

In addition, as shown in FIG. 9, when the first substrate 1 and the second substrate 2 are assembled, since the extension direction of the plurality first strip electrodes 11 (for example, the second direction Y) is different from the extension direction of the plurality of second strip electrodes (for example, the first direction X), in the normal direction Z of the first substrate 1, the extension direction of the plurality first strip electrodes 11 (for example, the second direction Y) may be perpendicular (i.e., orthogonal) to the extension direction of the plurality of second strip electrodes 21 (for example, first direction X).

The electronic device of the present disclosure can respectively control the liquid crystal material 31 and the dye material 32 through the plurality of first strip electrodes 11 and the plurality second strip electrodes 21 disposed on the first substrate 1 and second substrate 2. Thus, the purpose of switching the transmissive state and non-transmissive state can be achieved without disposing additional polarizers or multiple laminated panels, so the problem of the light transmission control effect of the transmissive state and the non-transmissive state, large thickness and heavy weight of the electronic device can be improved or the manufacturing cost of the electronic device can be reduced.

The specific embodiments above should be interpreted as illustrative only, not limiting the rest of the present disclosure in any way, and the features of different embodiments can be mixed and matched as long as they do not conflict with each other.

Although the present disclosure has been explained in relation to its embodiment, it is to be understood that many other possible modifications and variations can be made without departing from the spirit and scope of the disclosure as hereinafter claimed.

The invention claimed is:

1. An electronic device, comprising:

a panel, comprising:
- a first substrate;
- a second substrate disposed opposite to the first substrate;
- a light modulation layer disposed between the first substrate and the second substrate;
- a plurality of first strip electrodes disposed between the first substrate and the light modulation layer and comprising a plurality of first parts and a plurality of second parts, wherein the plurality of first parts and the plurality of second parts are alternately arranged along a first direction;

a plurality of second strip electrodes disposed between the second substrate and the light modulation layer and comprising a plurality of third parts and a plurality of fourth parts, wherein the plurality of third parts and the plurality of fourth parts are alternately arranged along a second direction, and the first direction is different from the second direction;

a first electrode disposed between the first substrate and the plurality of first strip electrodes;

a second electrode disposed between the second substrate and the plurality of second strip electrodes;

a first refractive index matching layer disposed between the first substrate and the first electrode;

a second refractive index matching layer disposed between the second substrate and the second electrode;

a first insulating layer disposed between the first electrode and the plurality of first strip electrodes; and a second insulating layer disposed between the second electrode and the plurality of second strip electrodes, wherein the light modulation layer comprises a liquid crystal material and a dye material, and an extension direction of the plurality of first strip electrodes is different from an extension direction of the plurality of second strip electrodes;

wherein a first potential is applied to the plurality of first parts, a second potential is applied to the plurality of second parts, a third potential is applied to the plurality of third parts, and a fourth potential is applied to the plurality of fourth parts when the panel is in a non-transmissive state, wherein the first potential is different from the second potential, and the third potential is different from the fourth potential.

2. The electronic device of claim 1, wherein the extension direction of the plurality of first strip electrodes is perpendicular to the extension direction of the plurality of second strip electrodes.

3. The electronic device of claim 1, wherein the panel is in a transmissive state when no potential is applied to the plurality of first strip electrodes, the plurality of second strip electrodes, the first electrode and the second electrode.

4. The electronic device of claim 1, wherein the plurality of first strip electrodes further comprise a first connecting part and a second connecting part, the plurality of first parts connect to the first connecting part, and the plurality of second parts connect to the second connecting part.

5. The electronic device of claim 1, wherein the plurality of second strip electrodes further comprise a third connecting part and a fourth connecting part, the plurality of third parts connect to the third connecting part, and the plurality of fourth parts connect to the fourth connecting part.

6. The electronic device of claim 1, wherein a potential difference between the first potential and the second potential is different from a potential difference between the third potential and the fourth potential.

7. The electronic device of claim 1, wherein a potential difference between the first potential and the second potential is the same as a potential difference between the third potential and the fourth potential.

8. The electronic device of claim 1, wherein a fifth potential is applied to the first electrode, and the first potential is different from the fifth potential.

9. The electronic device of claim 1, wherein a fifth potential is applied to the first electrode, and the first potential, the second potential and the fifth potential are different from each other.

10. The electronic device of claim 1, wherein a sixth potential is applied to the second electrode, and the third potential is different from the sixth potential.

11. The electronic device of claim 1, wherein a sixth potential is applied to the second electrode, and the third potential, the fourth potential and the sixth potential are different from each other.

12. The electronic device of claim 1, wherein a potential applied to the first electrode is different from a potential applied to the second electrode when the panel is in a transmissive state.

13. The electronic device of claim 1, wherein a thickness of the light modulation layer ranges from 5 μm to 25 μm in a normal direction of the first substrate.

* * * * *